Aug. 25, 1964 A. V. POHM 3,146,353

MAGNETIC THIN FILM LOGIC CIRCUITS

Filed Oct. 10, 1960

INVENTOR

ARTHUR V. POHM

BY Cushman, Darby & Cushman

ATTORNEYS

United States Patent Office 3,146,353

Patented Aug. 25, 1964

3,146,353

MAGNETIC THIN FILM LOGIC CIRCUITS

Arthur V. Pohm, Ames, Iowa, assignor to Sperry Rand Corporation, New York, N.Y., a corporation of Delaware Filed Oct. 10, 1960, Ser. No. 61,625
8 Claims. (Cl. 307—88)

Figure 1:
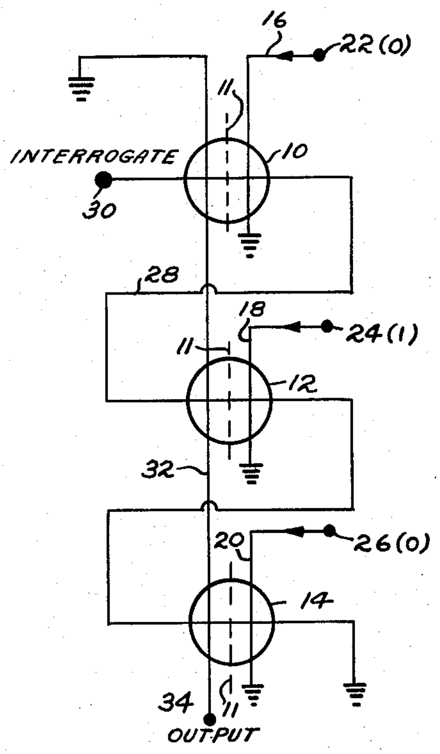

This invention relates generally to logic circuits and more particularly to a circuit employing the reversible rotation properties of thin deposited magnetic films to provide a novel Or circuit.

One of the requirements of modern electronic equipment, particularly in computer applications, is to perform the logic operations of Boolean algebra.

One of these operations is that of the logical Or function, which in the past has been accomplished by circuits employing toroidal magnetic cores or transistors. The basic function of an Or circuit is to provide an output when any one, or more, of a number of inputs to the circuit is present.

A new form of magnetic circuit element has recently been developed, which comprises a thin (generally less than 10,000 Angstrom units thick) bistable, metal film of magnetic material made, for example by vacuum deposition as in Rubens Patent No. 2,900,282, so as to have uniaxial anisotropy. These films have some peculiar properties, among them the property of reversible rotation of the remanent magnetization of the film. This remanent magnetization lies along what is known as the "preferred" or "easy" axis of the film in either of two preferred directions forming the two different stable states. It has been discovered that when a field is applied at an angle to this remanent magnetization or easy axis, the remanence of the film is biased, i.e., rotated from its original direction, or established position, through a given angle, depending on the strength of the applied field, the angle of application, and the strength of the remanent magnetization. If the angle of the biasing field is 90°, which is the usual case, and too strong, the film will be substantially demagnetized along its easy axis upon release of that field if no easy axis field is then present, for the magnetization vector rotates beyond its irreversible threshold (generally in the range 30° to 60° according to the particular film in question) and no force is present to rotate it back from or beyond 90° to 0° or 180° or even into an angular range from which it will automatically go to 0° or 180°. If a transverse biasing field is not strong enough to rotate the remanence to its irreversible threshold, then the remanence will return to its original position along the easy axis when that field is removed from the film. The relative strength of transverse biasing field useable with the present invention may be discerned from the Davis application Serial No. 383, filed January 4, 1960.

When there is a longitudinal field applied antiparallel to the original direction of the remanent magnetization and concurrently with or during the existence of the transverse biasing field, the magnetization vector will rotate again to a greater angle and will likewise rotate back or revert to its original position providing that the total effect of the applied fields is not such as to cause the remanence to rotate beyond its irreversible threshold so as to reverse polarity, or in other words, cause the film to switch its state. The reversible rotation of the remanence can be detected as a signal produced in a sense line associated with the film element. In the past, this signal has been used to indicate the (unchanged) binary state of the remanence, or the binary value of the applied biasing field.

Briefly described, applicant's invention employs the reversible rotation effect of a thin film magnetic memory element to accomplish the above mentioned logical Or function.

One object of this invention is therefore to provide a circuit including magnetic film memory means and the reversible rotation properties thereof to perform an Or function.

Another object of this invention is to provide a circuit as in the preceding object and including a plurality of thin film magnetic elements respectively for receiving the Or inputs as transverse biasing fields.

Figure 3:
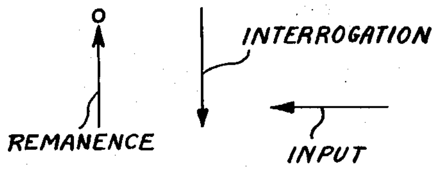
Figure 2:
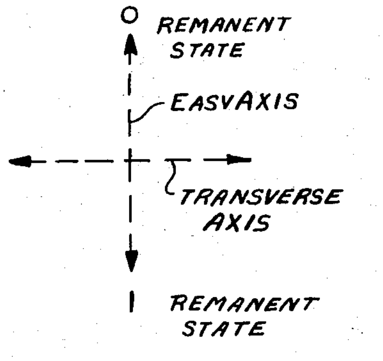
Figure 4:
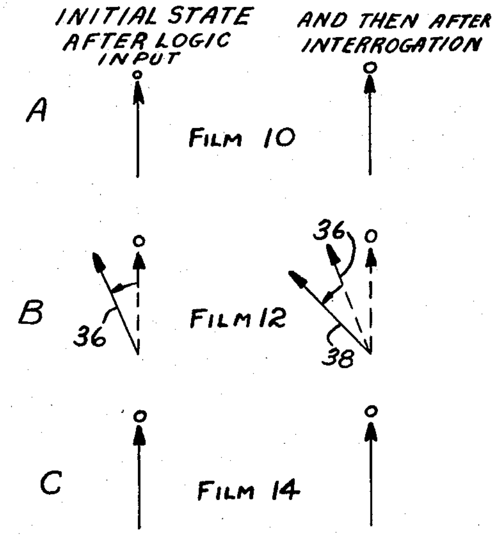

Still other objects of this invention will become apparent to those of ordinary skill in the art by reference to the following detailed description of the exemplary embodiment of the apparatus and the appended claims. The various features of the exemplary embodiment according to the invention may be best understood with reference to the accompanying drawing wherein:

FIGURE 1 is schematic diagram of a logic circuit, according to one embodiment of this invention, FIGURE 2 is a pictorial representation of the orientation of the remanent magnetization of a thin film memory element, FIGURE 3 is a representation of one possible relationship between the respective fields employed in the circuit of FIGURE 1, and FIGURE 4 is a showing of the results of applying fields as in FIGURE 3 to the film elements of FIGURE 1.

Shown in FIGURE 1 are a plurality of film elements 10, 12 and 14, preferably of the type above described, arranged so that the easy axis 11 of each is aligned with that of the others, though such alignment is unessential to this invention. The remanence of each film is initially in its arbitrarily defined 0 remanent direction or state, the magnetization vector being pointed upwardly as shown in FIGURE 2. Input lines 16, 18 and 20 are connected to input terminals 22, 24, and 26, respectively, for receiving logical inputs, and are arranged parallel to the easy axes 11 of films 10, 12 and 14, respectively. An interrogate line 28, connected to interrogation input terminal 30, links each of the films 10, 12 and 14 in the same direction and transversely of the easy axes. In the embodiment shown in FIGURE 1, an output or sense line 32, connected to the output terminal 34, links each of the films 10, 12 and 14 in the same direction and parallel to the easy axis.

One possible relationship between the remanence and the fields resulting from the input and interrogation signals is shown in FIGURE 3, wherein the input or bias field is applied along the transverse axis of a film, and the interrogation field is applied along the easy axis antiparallel to the initial or 0 remanence direction.

By adopting the convention that a 0 logical input indicates the absence of an input or bias signal while a 1 logical input indicates the presence of such a bias signal, along with the conditions shown in FIGURES 2 and 3, the operation of the circuit of FIGURE 1 will be described. Assume that logic inputs of 0, 1 and 0 appear at respective terminals 22, 24 and 26, as shown; then, as seen in the left column of FIGURE 4, there is no change in the remanence of films 10 and 14, while the input to terminal 24 biases or rotates the remanence of film 12 from its 0 (easy axis) position to the position indicated by vector 36. Therefore, the magnetization vector of any film is rotated or biased upon receipt of a logic input of one binary sense but not the other.

If, during the existence of the input or bias signals, an interrogation signal of proper polarity is applied to terminal 30, then, as seen in the right column of FIGURE 4, the resultant interrogation field being parallel to the established or unbiased remanence direction, does not affect the remanence of films 10 and 14, but combines vectorally with the biased remanence 36 of film 12 to further rotate that remanence to the positions of vector 38, producing an output signal in sense line 32 proportional to the remanence change perpendicular to the easy axis. Similarly, an output signal is produced whenever an interrogation signal occurs during the existence of any one, or more, of the inputs to terminals 22, 24 or 26. Thus, the circuit operates to fulfill the Boolean Inclusive Or equation $A=B+C+D$. The circuit can, of course, handle more or less inputs by adding or subtracting one film for each input.

It should be noted that the interrogation field can be applied either parallel or antiparallel to the preferred direction of remanence, depending on the desired direction of rotation, but that it should not be applied at any other angle since it would, in that case, produce an output signal in the sense line whether or not there were any biasing signals present.

In the preferred embodiment of FIGURE 1, the strength of the applied bias and interrogation fields are selected such that the bias field alone does not produce sufficient rotation to yield a significant output signal and also such that the combined effect of a bias field and the interrogation field on any given film is not so great as to rotate the remanence of that film beyond its reversible limit. This latter feature simplifies the task of accomplishing the Or function through non-destructive readout or sensing of the films.

One feature and advantage of the above embodiment is the isolation of the various inputs, at least to some extent. However, where this is not too important a consideration, it is possible to simplify the above plural film Or circuit by employing only one film to which all of the logic inputs are applied, being careful that the total effect of all inputs and the interrogation field is insufficient to rotate the remanence beyond its reversible limit.

Another modification which is possible in the plural film embodiment, where the logic input field is strong enough to rotate the remanence to an output producing range, is to eliminate the interrogation field winding. If care is taken regarding the number of inputs employed and the resultant total effect of those inputs, this modification can also be applied to the single film Or circuit.

Thus it is apparent that this invention successfully achieves the various objects and advantages herein set forth.

Modifications of this invention not described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. An Or logic circuit comprising magnetic film means having stable remanence, a plurality of means each for biasing the remanence of said film means upon receipt of a respective logic input of one binary sense and not the other, interrogating means coupled to said film means for affecting said biased remanence, and an ouput line coupled to said film means for providing an output signal whenever any such biasing is affected by said interrogated means.

2. A circuit as in claim 1 including means for applying an interrogation field to said magnetic means along an axis which is substantially parallel to said stable remanence.

3. A circuit as in claim 2 wherein the physical axis of said output line is substantially parallel to the said axis along which said interrogation field is applied.

4. An Or logic circuit comprising a plurality of magnetic films each having a magnetization vector which is angularly rotatable from an established position in response to an applied field and reversibly rotatable back toward said established position upon release of the applied field, a plurality of means for applying a transverse field respectively to said films for rotating the magnetization vector of the repsective film upon receipt of a logic input of one binary sense and not the other, interrogating means coupled to said film means for affecting said rotated vector and an output line commonly coupling said films for providing an output signal whenever said rotated vector is affected by said interrogating means.

5. A circuit as in claim 4 and further including means for simultaneous interrogation of said films after receipt of the logic inputs to cause any magnetization vector which has been rotated by a logic input to be rotated again.

6. A circuit as in claim 5 wherein the last mentioned means includes means for applying an interrogation field to each of said films in opposition to said established vector positions.

7. A circuit as in claim 6 wherein, as to each of said films, the combined strength of the interrogation field and the field resulting from a logic input of the said one binary sense is insufficient to rotate the magnetization vector of that film to a point from which it will not return to said established position upon release of the interrogation and logic inputs.

8. A circuit as in claim 5 wherein each of the vector rotating means includes an input line having a physical axis substantially parallel to the physical axis of said output line, all said input and output lines being substantially parallel to the magnetization vectors when lying in their said established positions, said interrogation means including an interrogation line commonly coupling said films in a direction substantially perpendicular to said output and input lines.

References Cited in the file of this patent

UNITED STATES PATENTS 3,077,586 Foro ------------------ Feb. 12, 1963

OTHER REFERENCES

Publication (I): Raffel, "Operating Characteristics of a Thin Film Memory," Journal of Applied Physics, April 1959, pp. 60S–61S.

Publication (II): Arrot, "New Development in Magnetic Materials and Applications," Electrical Manufacturing, February 1959, pp. 59 and 60.

Publication (III): Pohm and Rubens, A Compact Coincident-Current Memory. Proceedings of Eastern Joint Computer Conference, December 10–12, 1956, pp. 120–123, pub. June 1957.